(12) United States Patent
Clark

(10) Patent No.: US 8,882,167 B1
(45) Date of Patent: Nov. 11, 2014

(54) VEHICLE SIDE MIRROR CIGARETTE HOLDER

(71) Applicant: Lorenzo Preston Clark, Saint Cloud, FL (US)

(72) Inventor: Lorenzo Preston Clark, Saint Cloud, FL (US)

( * ) Notice: Subject to any disclaimer, the term of this patent is extended or adjusted under 35 U.S.C. 154(b) by 0 days.

(21) Appl. No.: 13/986,404

(22) Filed: Aug. 5, 2013

(51) Int. Cl.
*B60N 3/12* (2006.01)
*B60N 3/08* (2006.01)

(52) U.S. Cl.
CPC .................................. *B60N 3/086* (2013.01)
USPC ...................................................... 296/37.11

(58) Field of Classification Search
CPC ........................... A24F 19/0071; B60N 3/083
USPC ....................................................... 296/37.11
See application file for complete search history.

(56) References Cited

U.S. PATENT DOCUMENTS

| | | | | | |
|---|---|---|---|---|---|
| 2,272,697 | A | * | 2/1942 | Frei, Jr. .......................... | 206/496 |
| D247,447 | S | * | 3/1978 | Ricaud .......................... | D27/104 |
| 4,190,284 | A | * | 2/1980 | Schmidhuber et al. .. | 297/188.16 |
| D258,468 | S | * | 3/1981 | Whitlock ..................... | D27/104 |
| D318,354 | S | * | 7/1991 | Delmerico ...................... | D34/7 |
| D545,490 | S | * | 6/2007 | Tai .............................. | D27/136 |

* cited by examiner

*Primary Examiner* — Lori L Lyjak

(57) ABSTRACT

A plastic or metal cigarette receptacle that attaches to both the driver and passenger car door mirrors. The detachable receptacle can be in the form of a small square with sharp or rounded edges. The receptacle can be a few inches in length and a few inches in height. The container can be attached by its arms with the use of screws, bolts, and washers. Also, the cigarette container will have another option where it is custom and therefore is built right into the car door mirror itself. The custom receptacle portion of the mirror would be on the bottom of the mirror. All options will have a sliding trap door at the bottom to remove used cigarette butts from the receptacle. The plastic detachable receptacle and the custom mirror built-in receptacle would have a non-flammable metal inner lining.

11 Claims, 7 Drawing Sheets

VEHICLE SIDE MIRROR CIGARETTE HOLDER

REFERENCE TO RELATED APPLICATION

This application claims priority to U.S. Non-Provisional application Ser. No. 13/968,404, filed Apr. 29, 2013. The entire content of which is incorporated herein by reference.

FIELD OF INVENTION

The present invention relates to general cigarette receptacles. However, it is the usage of this particular invention that is unique as it is attached to the exterior of a vehicle.

BACKGROUND OF THE INVENTION

As it relates to vehicles and cigarette receptacles, holders and ash trays they have been primary used inside of the vehicle to extinguish cigarettes and cigars. Various vehicle cigarette receptacles, holders, and ash trays have been developed over the years including smokeless ash trays that are suppose to extinguish the cigarette in the car while filtering out the smoke. Many people who smoke cigarettes and cigars still are reluctant to use interior vehicle smokeless ash trays even though it's suppose help with the issue of the smoker not wanting to smell the cigarette butt being extinguished. Many people continue to just throw millions of cigarette butts into the streets and soil each day. Cigarette butts also start many of the nations wild fires that cost American tax payers billions of dollars on an annual bases. To address this lingering issue, U.S. patent Ser. No. 13/968,404 provides a vehicle side mirror cigarette holder where the cigarette can be extinguished outside of the vehicle without the smoker having to smell the cigarette butt being extinguished. Also, the cigarette holder will keep the cigarette butts and cigar stems in its containment area until it's full. Then the cigarette butts can be released from the receptacle and disposed of properly.

The Vehicle Side Mirror Cigarette Holder, U.S. patent Ser. No. 13/968,404 will have a small metal or plastic receptacle that can be affixed to most vehicle mirrors from its back or bottom base. It will be affixed with the usage of metal arms and the use of screws, bolts and washers. The cigarette holder and the custom cigarette holder option will have a sliding trap door at the bottom of the receptacle.

The plastic cigarette holder will also have a metal interior lining to protect the receptacle from being burned by cigarette butts and cigar stems. The cigarette holder will also have the option of a front and back breathable mesh. The last option as part of the Vehicle Side Mirror Cigarette Holder will be a custom option that will be built at the factory as a standard or upgrade to the vehicle.

When the smoker is ready to extinguish and dispose of the cigarette they can simply push cigarette butt through the hole opening in the vehicle side mirror cigarette holder. This will keep the smell of the extinguished cigarette outside the vehicle and the cigarette will extinguish itself. This method of disposing of cigarette butts will give the general public another option in helping to protect the environment, soil, and water sources.

SUMMARY OF THE INVENTION

This invention resides in cigarette receptacles, holders, ash trays and the like. However, this invention more specifically is for extinguishing and properly storing of cigarette butts and cigar stems outside of the vehicle.

The Vehicle Side Mirror Cigarette Holder will be detachable whereby it can be affixed to the bottom base of the mirror to the exterior driver and passenger vehicle door. There will also be an option to attach the side door cigarette holder to back of the of vehicle side door mirror. The cigarette holder will either be metal or plastic and its length can range from 2 to 5 inches and the height can be 2 to 5 inches.

The cigarette holder will also have an option where it can have a breathable mesh on the front and back of the receptacle. The metal mesh will allow the cigarette to be extinguished more quickly but still keep all the cigarette butts trapped and properly stored until disposed. The plastic cigarette holder will have a metal inner lining to insure that the cigarette butts and cigar stems will be properly extinguished and stored without burning the receptacle.

DETAILED DESCRIPTION OF THE INVENTION

This invention relates to vehicle cigarette holders, receptacles, ash trays, and the like. These are usually found as a permanent or detachable container somewhere inside the vehicle. In distinction from previous inventions, the cigarette holder according to this invention moves the function of disposing of the cigarette or cigar outside of the vehicle. This invention gives the smoker the ability to allow the cigarette or cigar to extinguish itself outside the vehicle without the smoker having to smell the cigarette being extinguished inside the vehicle. Also, this invention allows the smoker to give pause to simply discarding the cigarette or cigar on the ground. Since the vehicle side mirror cigarette holder is in the smokers line of sight they might think to simply place the cigarette butt or cigar stem in the receptacle.

Figure 1:
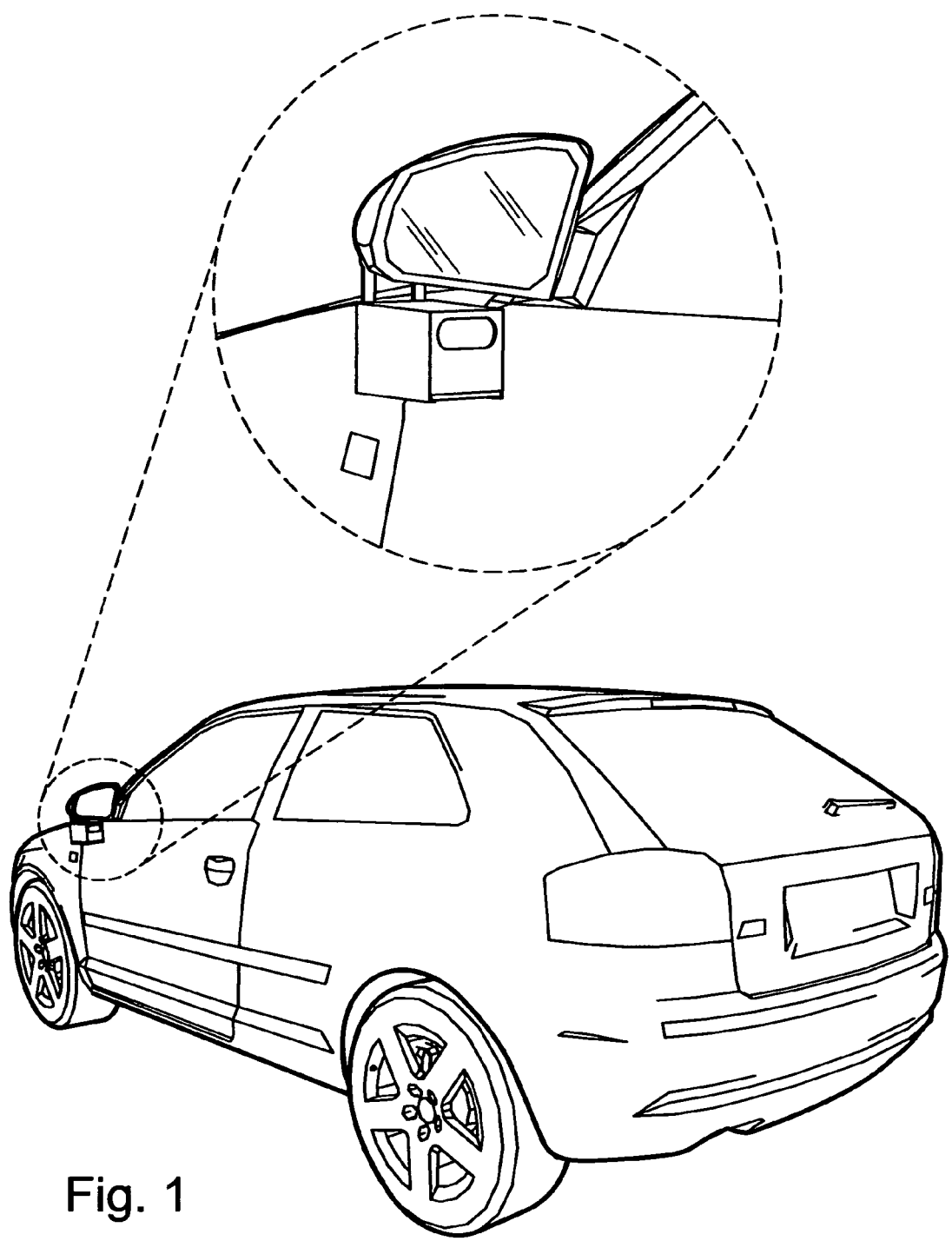
FIG. 1 is a drawing that shows where the cigarette holder will be placed in reference to the vehicle.

FIG. 1 illustrates a visual embodiment of how the Vehicle Side Mirror Cigarette Holder can be attached to the vehicle side door mirror.

Figure 2:
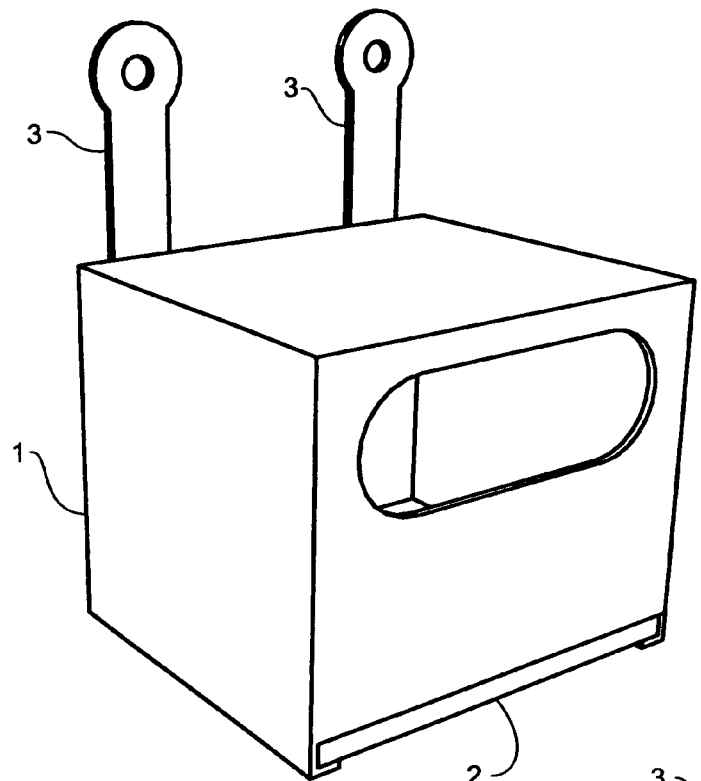
FIG. 2 is a drawing that shows option 1 of the embodiment of the invention with the vertical mounting arms.

FIG. 2 illustrates generally a preferred embodiment of the invention. The assembly comprises a plastic or metal receptacle 1 with a hole opening in the front along with two mounting arms 3 and a sliding trap door 2 at the bottom of the receptacle. The plastic receptacle 1 would also have a metal inner lining.

Figure 3:
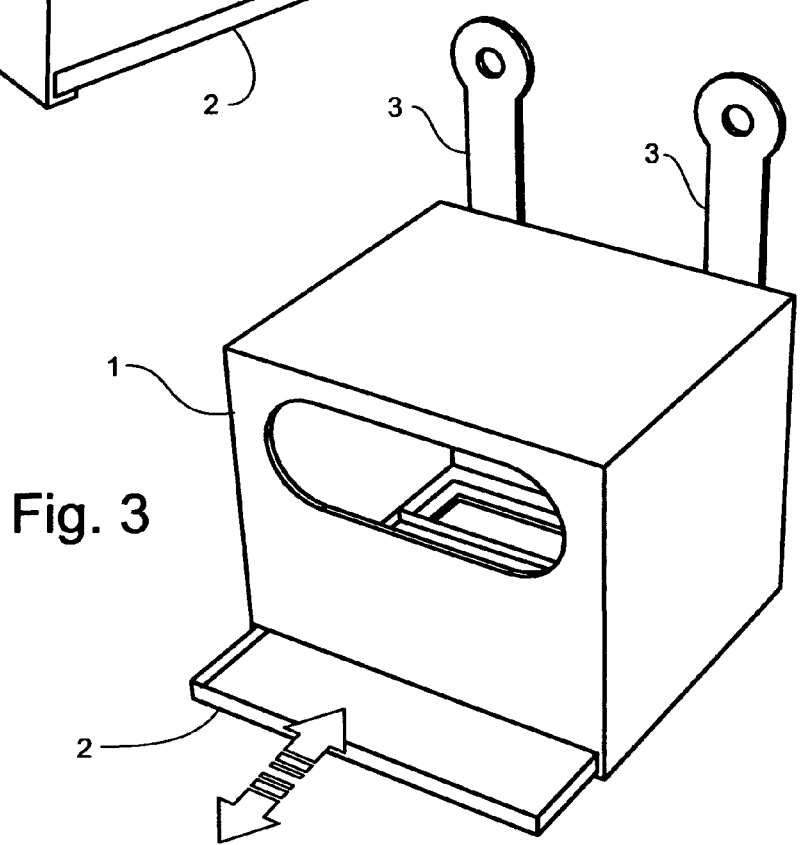
FIG. 3 is a drawing that shows option 1 of the embodiment of the invention with the trap door sliding out and the vertical mounting arms.

FIG. 3 illustrates generally a preferred embodiment of the invention. The assembly comprises a plastic or metal receptacle 1 with a hole opening in the front along with two mounting arms 3 and a sliding trap door 2 at the bottom of the receptacle. The sliding trap door 2 is visually depicting the functional movement of the sliding trap door. The plastic receptacle 1 would also have a metal inner lining.

Figure 4:
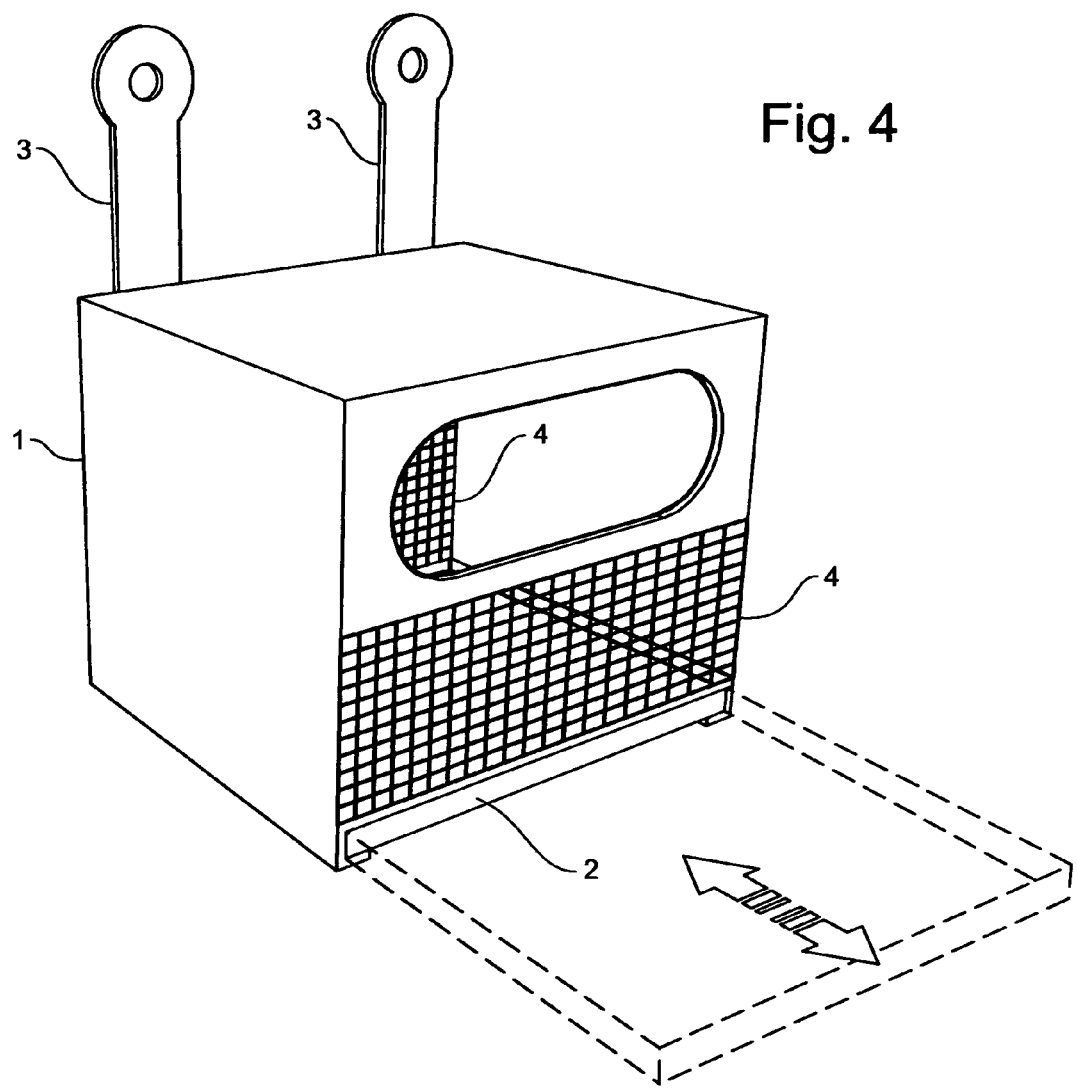
FIG. 4 is a drawing that shows option 2 of the embodiment of the invention with a breathable mesh that would help extinguish the cigarette butt quicker but also trap the discarded cigarette butts and cigar stems. It also shows the movement of the sliding trap door and the vertical mounting arms.

FIG. 4 illustrates an alternative embodiment of the invention. The assembly comprises a plastic or metal receptacle 1 with a hole opening in the front along with two mounting arms 3 and a sliding trap door 2 at the bottom of the receptacle. The sliding trap door 2 is visually depicting the functional movement of the sliding trap door. A plastic or metal receptacle 1 is also shown with a breathable metal mesh option whereby it could more quickly extinguish the cigarette butt or cigar stem through air flow.

Figure 5:
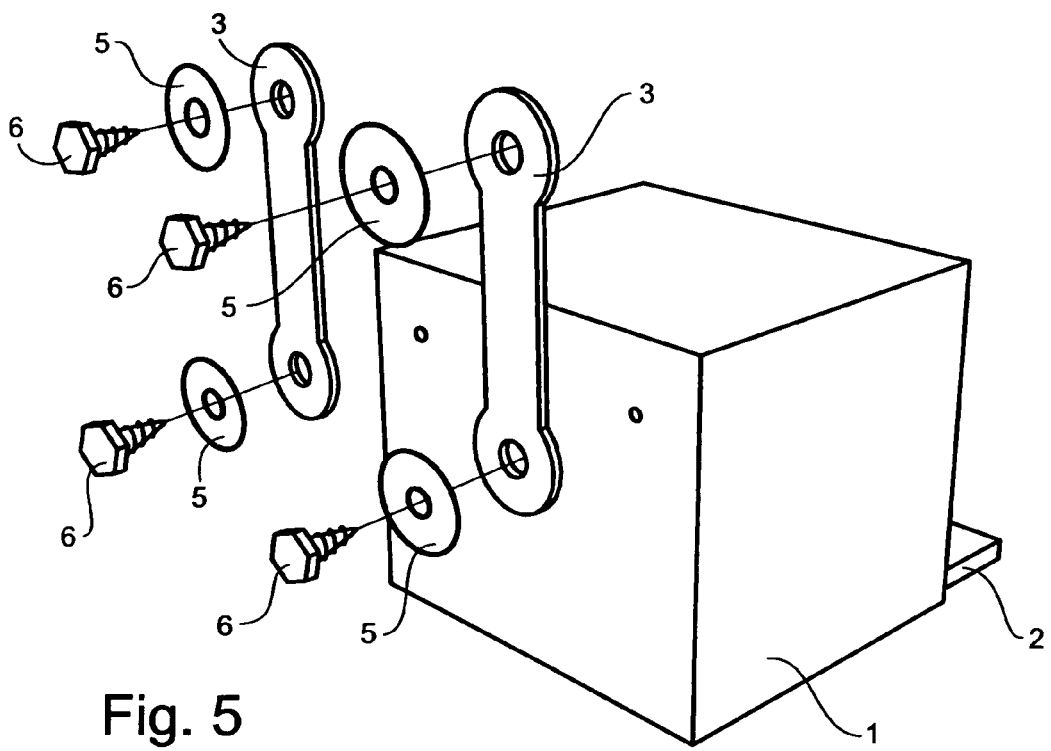
FIG. 5 is a drawing that shows option 1 of the embodiment with the bolts, screws and washers that would be used to attach the cigarette holder to the mirror. It also includes the mounting arms.

FIG. 5. illustrates generally a preferred embodiment of the invention. The assembly comprises a plastic or metal receptacle 1 with two mounting arms 3 that would attach to the back of receptacle 1 by two screws 6 and two washers 5. The upper mounting arms 3 would attach to the back of the vehicle side door mirror with two screws 6 and two washers 5. The sliding trap door 2 is visually depicting the functional movement of the sliding trap door.

Figure 6:
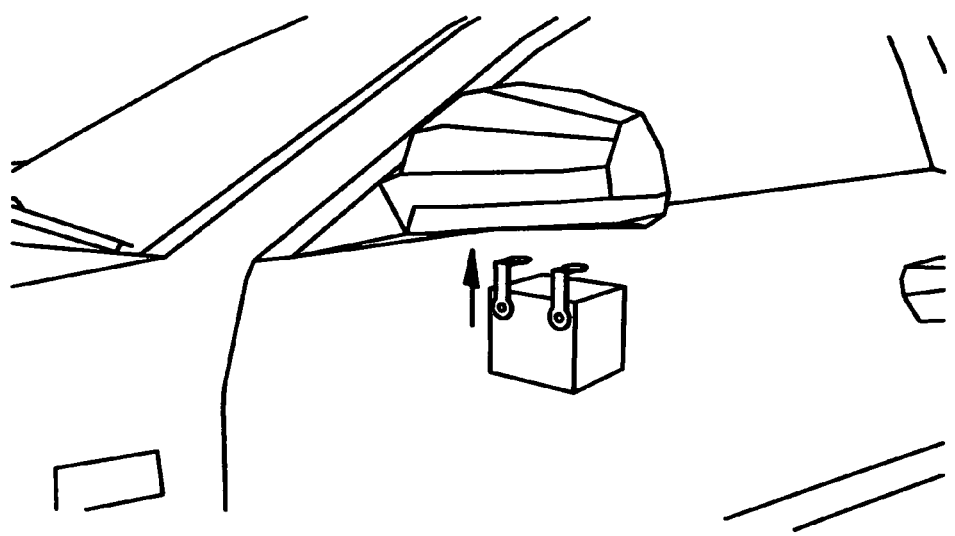
FIG. 6. is a drawing that shows option 1 of the embodiment with 90 degree angle mounting arms in reference to the vehicle.

FIG. 6 illustrates a visual embodiment of how the Vehicle Side Mirror Cigarette Holder can be attached to the vehicle side door mirror. Unlike FIG. 1, this visual illustration shows the mounting arms 7 with a 90 degree angle attaching to the bottom side of the vehicle side door mirror.

Figure 7:
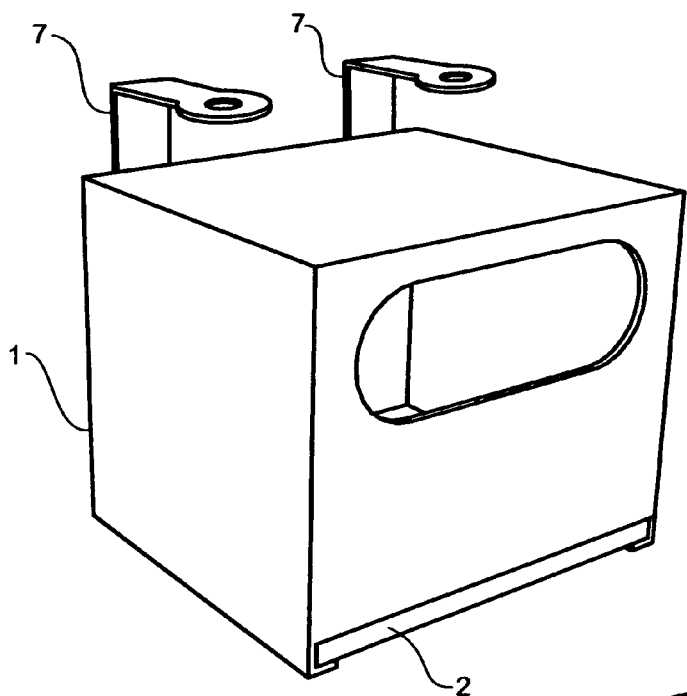
FIG. 7 is a drawing that shows option 3 of the embodiment with 90 degree angle mounting arms.

FIG. 7 illustrates an alternative embodiment of the invention. The assembly comprises a plastic or metal receptacle 1 with a hole opening in the front along with two 90 degree angle mounting arms 3 and a sliding trap door 2 at the bottom of the receptacle. The plastic receptacle 1 would also have a metal inner lining.

Figure 8:
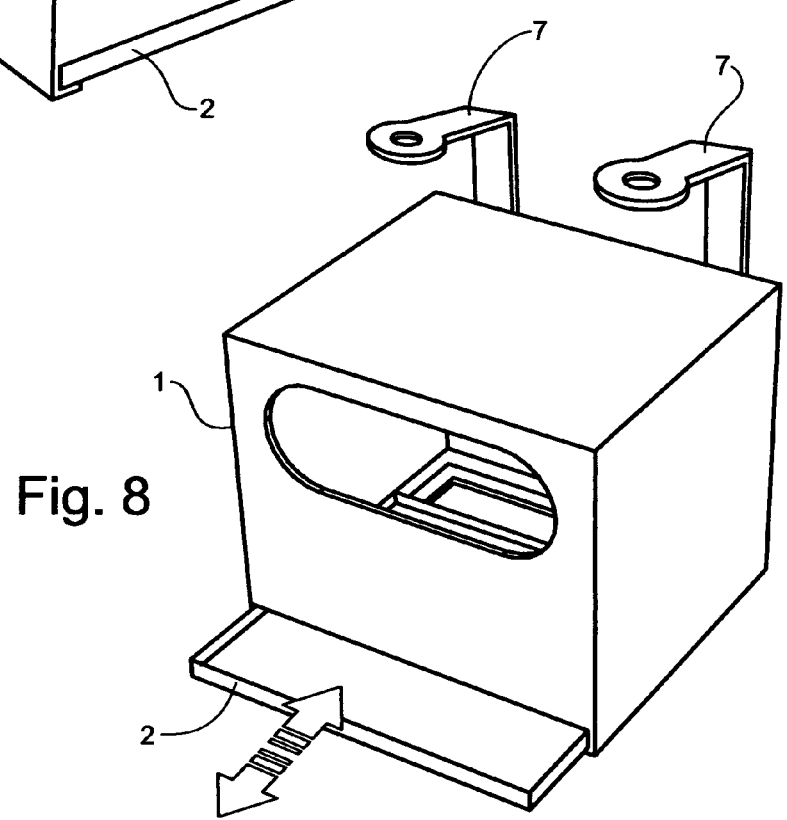
FIG. 8 is a drawing that shows option 3 of the embodiment with 90 degree angle mounting arms. It also shows the movement of the sliding trap door.

FIG. 8 illustrates an alternative embodiment of the invention. The assembly comprises a plastic or metal receptacle 1 with a hole opening in the front along with two 90 degree angle mounting arms 3 and a sliding trap door 2 at the bottom of the receptacle. The sliding trap door 2 is visually depicting the functional movement of the sliding trap door. The plastic receptacle 1 would also have a metal inner lining.

Figure 9:
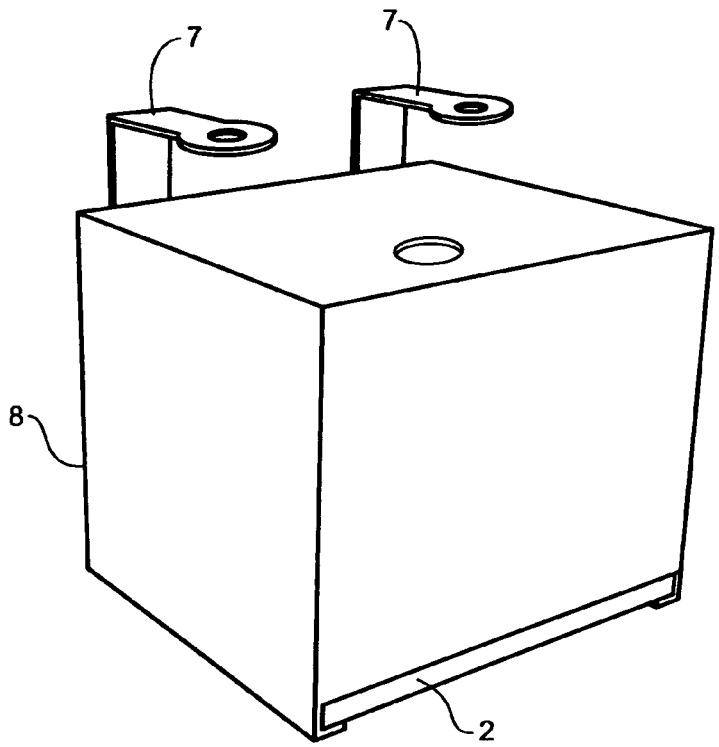
FIG. 9 is a drawing that shows option 4 of the embodiment with 90 degree angle mounting arms. The cigarette holder will have a hole opening in the top for storage of the cigarette butts and cigar stems.

FIG. 9 illustrates an alternative embodiment of the invention. The assembly comprises a plastic or metal receptacle 8 with a hole opening at the top along with two 90 degree angle mounting arms 3 and a sliding trap door 2 at the bottom of the receptacle. The plastic receptacle 8 would also have a metal inner lining.

Figure 10:
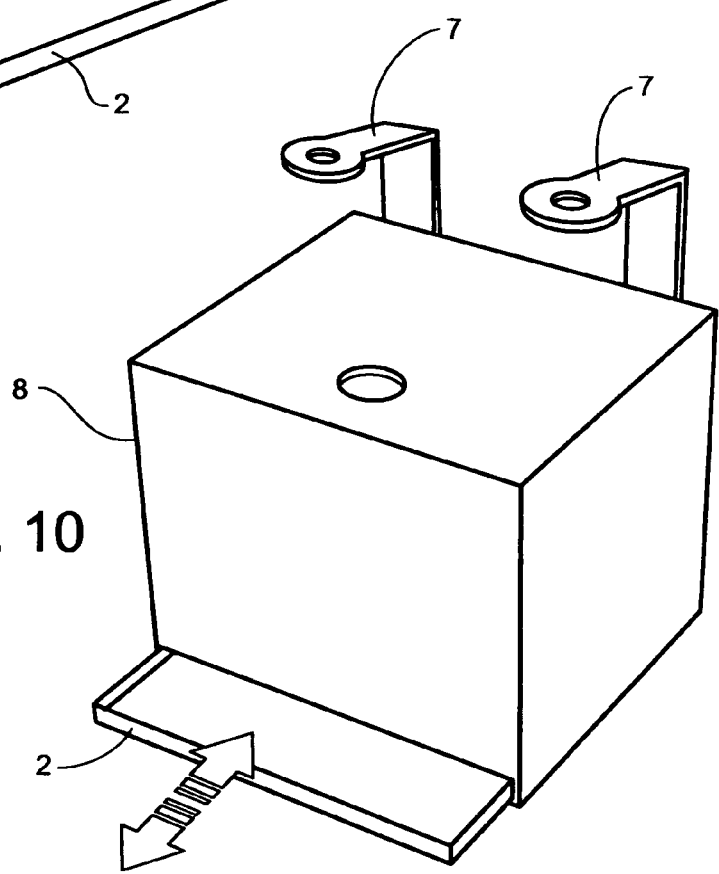
FIG. 10 is a drawing that shows option 4 of the embodiment with a 90 degree angle mounting arms. The cigarette holder will have a hole opening in the top for storage of the cigarette butts and cigar stems. It also shows the movement of the sliding trap door.

FIG. 10 illustrates an alternative embodiment of the invention. The assembly comprises a plastic or metal receptacle 8 with a hole opening at the top along with two 90 degree angle mounting arms 3 and a sliding trap door 2 at the bottom of the receptacle. The sliding trap door 2 is visually depicting the functional movement of the sliding trap door. The plastic receptacle 8 would also have a metal inner lining.

Figure 11:
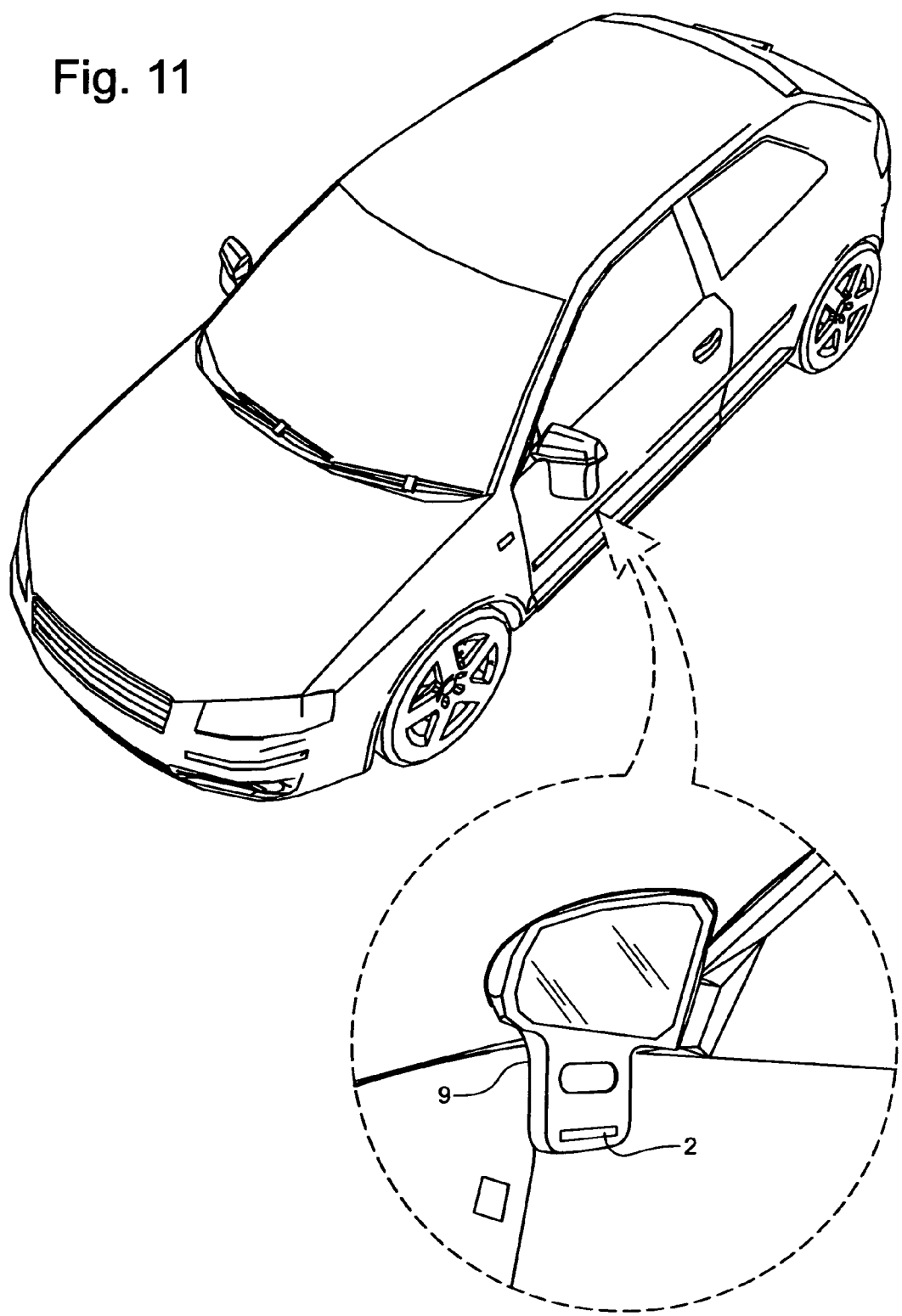
FIG. 11 is a drawing of a custom cigarette receptacle embodiment of the invention. It will be built at the factory for addition to the vehicle at the assembly plant. Also, the custom cigarette receptacle could be already assembled on the door prior to reaching the assembly plant. The custom cigarette holder will have a hole opening in the front for storage of the cigarette butts and cigar stems. It will also have a sliding trap door at the bottom for removal of the cigarette butts and cigar stems.

FIG. 11 illustrates a visual embodiment of how the Custom Vehicle Side Mirror Cigarette Holder as a single part can look. The assembly comprises a custom side door mirror that has a plastic or metal receptacle 9 along with a sliding trap door 2 at the bottom of the receptacle.

I claim:

1. A detachable vehicle side mirror cigarette receptacle assembly, comprising a metal or plastic receptacle including arms to attach the receptacle to the back and bottom base of the mirror, an open hole in the front and top of the receptacle, a sliding trap door at the bottom of the receptacle and breathable mesh on the front and back of the receptacle, the plastic detached receptacle option would have a metal inner lining making the receptacle non-flammable.

2. The assembly of claim 1, where the metal or plastic receptacle has a range of 2 to 5 inches in length and 2 to 5 inches in height.

3. The assembly of claim 1, where the receptacle has 2 metal arms that range from 2 to 4 inches in length.

4. The assembly of claim 1, where the receptacle has an open hole on the front to deposit cigarette butts and cigar stems.

5. The assembly of claim 1, where the receptacle has an open hole at the top to deposit cigarette butts and cigar stems.

6. The assembly of claim 1, where the receptacle has a sliding trap door at the bottom to release cigarette butts and cigar stems.

7. The assembly of claim 1, where the receptacle will have an optional design with a breathable mesh on the front and back of the receptacle.

8. A custom vehicle side mirror cigarette receptacle assembly, comprising a custom plastic fiberglass or metal receptacle, an open hole in the front of the receptacle, a sliding trap door at the bottom of the receptacle, custom side door mirror plastic and fiberglass receptacle option would have a metal inner lining making the receptacle non-flammable.

9. The assembly of claim 8, where the custom plastic fiberglass or metal receptacle with the mirror has a range of 6 to 12 inches in length and 6 to 12 inches in height.

10. The assembly of claim 8, where the custom plastic fiberglass or metal receptacle can be part of the factory side mirror molding, this could be done at the factory and shipped to the assembly plant already intact.

11. The assembly of claim 8, where the custom plastic fiberglass or metal receptacle has a breathable mesh on the front and back of the receptacle.

\* \* \* \* \*